US012519259B2

(12) United States Patent
Chen et al.

(10) Patent No.: US 12,519,259 B2
(45) Date of Patent: Jan. 6, 2026

(54) ELECTRICAL CONNECTOR

(71) Applicant: Tyco Electronics (Shanghai) Co., Ltd., Shanghai (CN)

(72) Inventors: Bo (Leo) Chen, Shanghai (CN); Hongbo (Daniel) Zhang, Shanghai (CN)

(73) Assignee: Tyco Electronics (Shanghai) Co., Ltd., Shanghai (CN)

( * ) Notice: Subject to any disclaimer, the term of this patent is extended or adjusted under 35 U.S.C. 154(b) by 312 days.

(21) Appl. No.: 18/241,370

(22) Filed: Sep. 1, 2023

(65) Prior Publication Data

US 2024/0079808 A1 Mar. 7, 2024

(30) Foreign Application Priority Data

Sep. 2, 2022 (CN) ........................ 202211074847.5

(51) Int. Cl.
*H01R 12/77* (2011.01)
*H01R 12/79* (2011.01)

(52) U.S. Cl.
CPC ......... *H01R 12/774* (2013.01); *H01R 12/778* (2013.01); *H01R 12/79* (2013.01)

(58) Field of Classification Search
None
See application file for complete search history.

(56) References Cited

U.S. PATENT DOCUMENTS 6,364,687 B1 * 4/2002 Chen .................. H01R 13/6275 439/607.02
7,510,424 B2 * 3/2009 Mundt ................. H01R 13/193 439/492
7,850,473 B1 * 12/2010 Ozeki .................... H01R 12/79 439/260
8,002,567 B2 * 8/2011 Hara ...................... H01R 12/89 439/329
8,317,533 B2 * 11/2012 Ishimaru .............. H01R 12/774 439/345
8,337,230 B1 * 12/2012 Kurachi ............... H01R 12/774 439/328
8,371,880 B2 * 2/2013 Ishimaru .............. H01R 12/774 439/632
8,608,509 B2 * 12/2013 Shimada .............. H01R 12/774 439/607.01
8,651,888 B2 * 2/2014 Kurachi ............... H01R 12/772 439/495

(Continued)

*Primary Examiner* — Ross N Gushi
(74) *Attorney, Agent, or Firm* — Barley Snyder

(57) ABSTRACT

An electrical connector includes a body having a terminal installation position for installing a terminal, a first connecting part, an accommodating cavity, and an insertion slot, a cover having a second connecting part, and an elastic support fixed in the accommodating cavity. The cover is movably connected to the body by the first connecting part and the second connecting part. The elastic support has a first elastic arm and a second elastic arm. The first elastic arm supports the cover. The second elastic arm has a snap-fit part locking an external insert inserted into the insertion slot at a preset position. The cover is movable relative to the body to have the second connecting part press and elastically deform the second elastic arm, driving the snap-fit part to move and unlock the external insert.

17 Claims, 5 Drawing Sheets

(56) References Cited

U.S. PATENT DOCUMENTS

| | | | | |
|---|---|---|---|---|
| 8,808,020 | B2 * | 8/2014 | Ikari | H01R 12/774 439/153 |
| 8,814,588 | B2 * | 8/2014 | Wang | H01R 12/774 439/358 |
| 8,968,020 | B2 * | 3/2015 | Nishiyama | H01R 12/79 439/345 |
| 9,401,554 | B2 * | 7/2016 | Takane | H01R 12/771 |
| 9,490,559 | B2 * | 11/2016 | Takane | H01R 12/774 |
| 10,164,364 | B2 * | 12/2018 | Asanuma | H01R 13/639 |
| 10,305,209 | B2 * | 5/2019 | Ishishita | H01R 12/774 |
| 10,530,082 | B2 * | 1/2020 | Motoyama | H01R 12/79 |
| 11,005,201 | B2 * | 5/2021 | Lin | H01R 13/6275 |
| 11,742,604 | B2 * | 8/2023 | Chang | H01R 12/725 439/153 |
| 11,862,881 | B2 * | 1/2024 | Wang | H01R 12/774 |
| 2012/0220171 | A1 * | 8/2012 | Shimada | H01R 12/774 439/660 |
| 2015/0171536 | A1 * | 6/2015 | Kameda | H01R 12/774 439/329 |

* cited by examiner

ELECTRICAL CONNECTOR

CROSS-REFERENCE TO RELATED APPLICATION

This application claims the benefit of the filing date under 35 U.S.C. § 119(a)-(d) of Chinese Patent Application No. 202211074847.5, filed on Sep. 2, 2022.

FIELD OF THE INVENTION

The disclosure relates to the field of electrical connection accessories, more particularly, to an electrical connector with an auto-locking structure.

BACKGROUND

An electrical connector is a conductive device that builds a bridge connection between two conductors of a circuit, allowing current or signals to flow from one conductor to another conductor. An electrical connector may also provide a separable interface to connect two sub-electronic systems; simply put, it is a component that used to complete electrical connections between circuits or electronic machines.

A representative connector is the FPC (Flexible Printed Circuit Board) connector, which can be used for the electrical connection of electronic devices such as liquid crystal displays, scanners, computer motherboards, telecommunications cards, memories, mobile hard drives, etc. In recent years, with the development of mobile devices, it has been widely used in mobile devices such as audio, digital devices, cameras, and mobile phones, with good development prospects and a huge market.

An FFC (Flexible Flat Cable) is a component for signal transmission. It has the advantages of arbitrary winding and high signal transmission. Therefore, it is widely used in many electronic products. The FFC is used in conjunction with an electrical connector, which serves as an FFC connector and can transmit signals from one end to the other.

However, the existing FPC/FFC connector has no auto-locking function, and the product easily falls off during use. Additionally, the user needs to open the cover to insert the FPC/FFC, which is inconvenient and weakens the market competitiveness of the product.

SUMMARY

An electrical connector includes a body having a terminal installation position for installing a terminal, a first connecting part, an accommodating cavity, and an insertion slot, a cover having a second connecting part, and an elastic support fixed in the accommodating cavity. The cover is movably connected to the body by the first connecting part and the second connecting part. The elastic support has a first elastic arm and a second elastic arm. The first elastic arm supports the cover. The second elastic arm has a snap-fit part locking an external insert inserted into the insertion slot at a preset position. The cover is movable relative to the body to have the second connecting part press and elastically deform the second elastic arm, driving the snap-fit part to move and unlock the external insert.

BRIEF DESCRIPTION OF THE DRAWINGS

Features of the present invention will become more apparent by describing in detail exemplary embodiments thereof with reference to the accompanying drawings, in which.

DETAILED DESCRIPTION OF EXEMPLARY EMBODIMENTS

The implementation and usage of the embodiments are discussed in detail below. However, it should be understood that the specific embodiments discussed herein are merely intended to illustrate exemplary ways of implementing and exerting the present disclosure, and are not intended to limit the scope of the present disclosure. When describing the components, the expressions used herein, such as “upper end”, “lower end”, “left side”, “right side”, “top”, and “bottom”, are not absolute, but relative. When the components are arranged as shown in the figures, these expressions are appropriate, but when the positions of these components in the figures are altered, these expressions should be altered accordingly.

Figure 1:
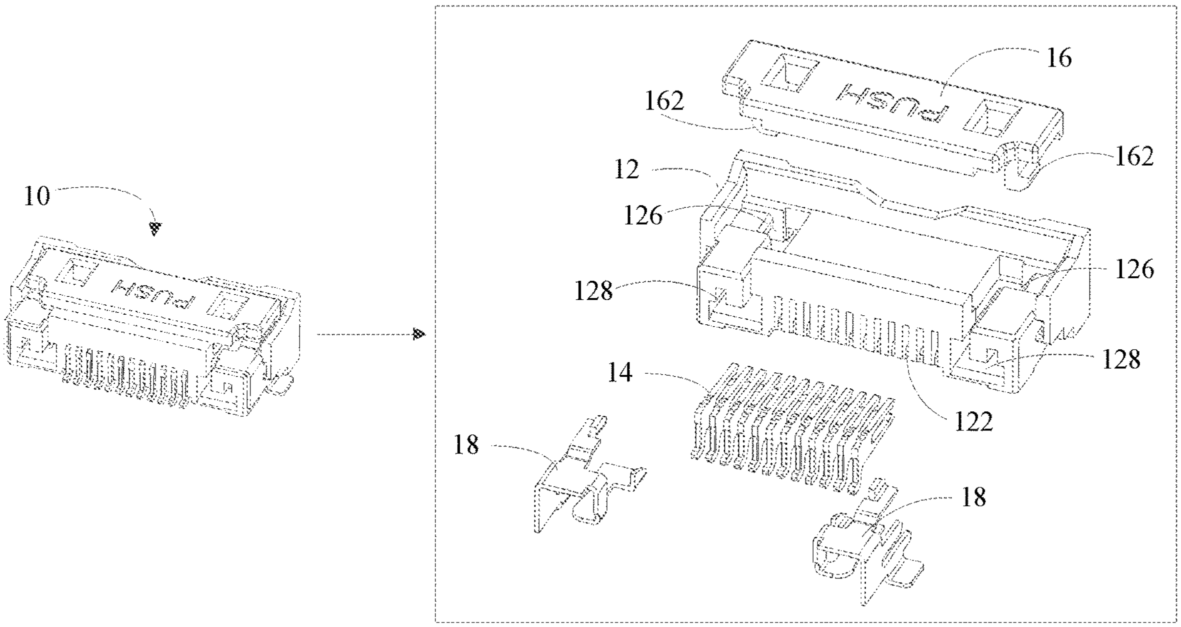
FIG. 1 is a schematic exploded view of an electrical connector according to an embodiment of the disclosure.
Figure 2A:
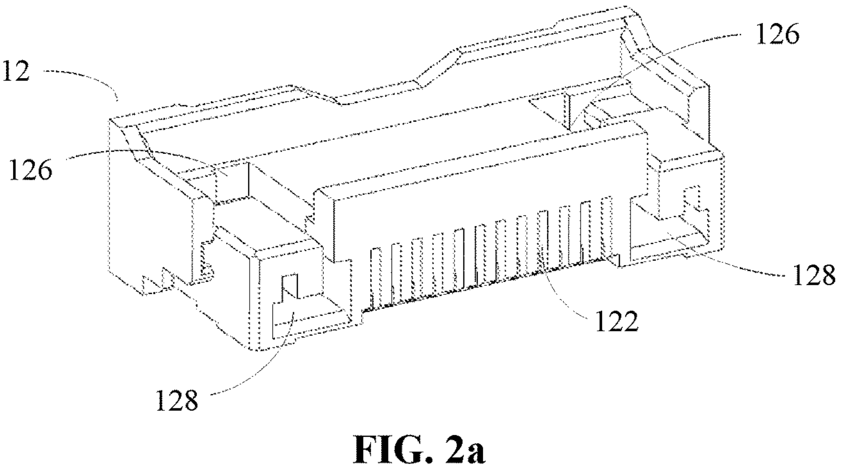
FIG. 2*a* is a schematic view of a front structure of a body according to an embodiment of the disclosure.
Figure 2B:
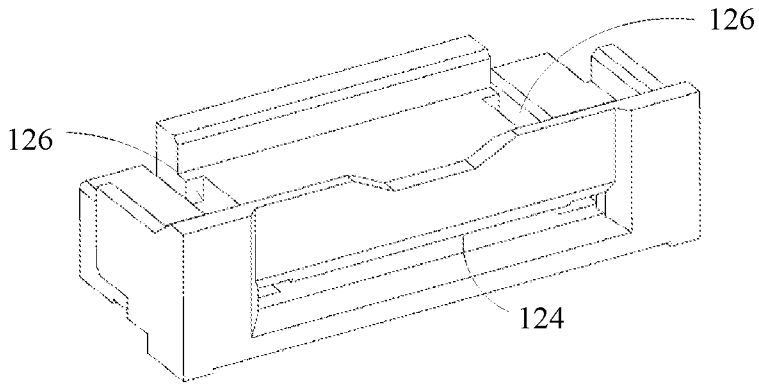
FIG. 2*b* is a schematic view of a back structure of the body according to an embodiment of the disclosure.
Figure 3A:
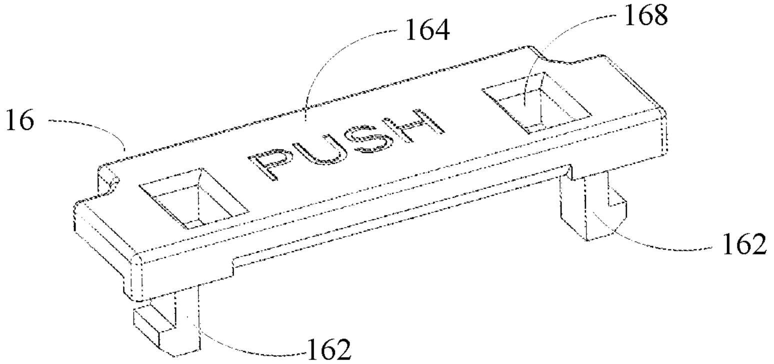
FIG. 3*a* is a schematic view of a front structure of a cover according to an embodiment of the disclosure.
Figure 3B:
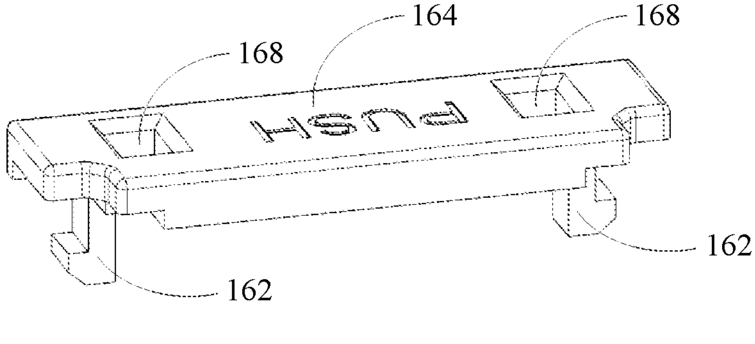
FIG. 3*b* is a schematic view of a back structure of the cover according to an embodiment of the disclosure.
Figure 4A:
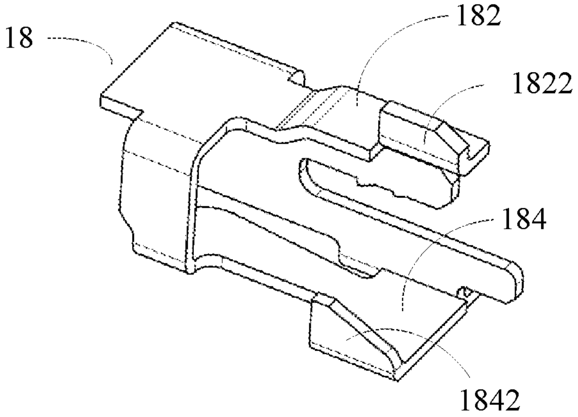
FIG. 4*a* is a schematic view of a front structure of an elastic support according to an embodiment of the disclosure.
Figure 4B:
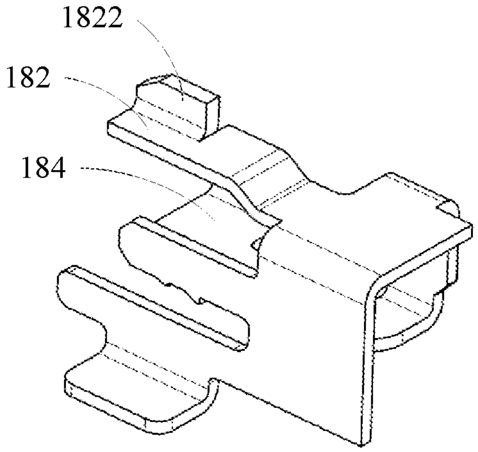
FIG. 4*b* is a schematic view of a back structure of the elastic support according to an embodiment of the disclosure.

FIG. 1 is a schematic exploded view of the electrical connector 10 according to an embodiment of the disclosure. As shown in FIG. 1, the electrical connector 10 includes: a body 12, a terminal 14, a cover 16 and an elastic support 18. FIG. 2*a* and FIG. 2*b* are the schematic views of the front structure and the back structure of the body 12 in FIG. 1, respectively. FIG. 3*a* and FIG. 3*b* are the schematic views of the front structure and the back structure of the cover 16 in FIG. 1, respectively. FIG. 4*a* and FIG. 4*b* are the schematic views of the front structure and the back structure of the elastic support 18 in FIG. 1, respectively.

The body 12 is provided with a terminal installation position 122 for installing the terminal 14, and is connected to external electrical connections via the terminal 14 to realize the electrical signal transmission function of the electrical connector 10. The body 12 is also provided with the insertion slot 124, shown in FIG. 2*b*, in which the external insert (such as FPC or FFC) is inserted to electrically connect with the terminal 14. The body 12 is also provided with a first connecting part 126 corresponding to the second connecting part 162 which the cover 16 is provided with. When the cover 16 is covered on the body 12, the body 12 and the cover 16 are movably connected via the first connecting part 126 and the second connecting part 162. The body 12 is further provided with the accommodating cavity 128 for accommodating the corresponding elastic support 18.

The terminal 14 (also called connection terminal) is located at the terminal installation position 122 of the body 12, and is used for transmitting electrical signals or conducting electricity. Optionally, there are copper silver plated terminals, copper galvanized terminals, copper terminals, aluminum terminals, and iron terminals. In some examples, a plurality of terminals 14 can be inserted into the corresponding terminal installation positions 122 of the body 12 to form a terminal row, the pins of which can be soldered to the PCB board for electrical connection with the outside, and optionally the pitch among the pins can be 0.50 mm pitch, 1.0 mm pitch, and etc. In some examples, the terminal 14 optionally can be a top contact terminal, a bottom contact terminal or a double-end contact terminal. Both sides of the double-end contact terminal can be in contact with the FPC/FFC soft board, that is, the FPC/FFC soft board can be inserted from two directions, thus the electrical connector can be used more flexibly.

The cover 16 is movably connected with the body 12 by a first connecting part 126 and a second connecting part 162, shown in FIGS. 1-3*b*, such as snap-fit connection. The second connecting part 162 is a bending structure extending from the top 164 of the cover 16, as shown in FIGS. 3*a* and 3*b*, and the first connecting part 126 is a slot disposed on the body 12, as shown in FIGS. 1-2*b*. After the second connecting part 162 is inserted into the first connecting part 126, the bending structure snaps into the slot, thus realizing the snap-fit connection between the cover 16 and the body 12. The cover 16 is snap-fit to the body 12, which has an advantage of convenient installation. In some examples, the bending structures of the second connecting parts 162 are directed to the left and the right respectively and away from an external insert.

In some examples, the cover 16 is covered on the body 12 at the top of the body 12. The insertion slot 124 is disposed on the side of the body 12, and it is unnecessary for user to flip the cover 16 to make the external insert inserted, which makes it more convenient to use. In some examples, terminal installation position 122 and the insertion slot 124 are located on the front and back sides of the body 12, respectively, which facilitates the electrical connection between the external insert and a terminal 14 when it is inserted into the insertion slot 124. In some examples, the movable distance of the cover 16 relative to the body 12 is not less than the height of a snap-fit part 1842.

The elastic support 18 is disposed in the accommodating cavity 128 of the body 12, and includes a first elastic arm 182 and a second elastic arm 184, as shown in FIGS. 4*a* and 4*b*, wherein the first elastic arm 182 is used to support the cover 16, and the second elastic arm 184 extends outwardly with the snap-fit part 1842. The snap-fit part 1842 is used for snap-fit connection with the external insert so as to lock the external insert at the inserted position. In some examples, the first elastic arm 182 is disposed above the second elastic arm 184 and close to the cover 16, thus shortening the distance from the first elastic arm 182 to the cover 16, saving materials and reducing costs.

When the external insert is inserted into the insertion slot 124, it is snap-connected with the snap-fit part 1842 to be locked at a preset position. The cover 16 can move relative to the body 12 when it is operated, thus the second connecting part 162 presses the second elastic arm 184 to undergo elastic deformation, so as to drive the snap-fit part 1842 to be disconnected from the external insert to unlock the external insert.

Figure 5A:
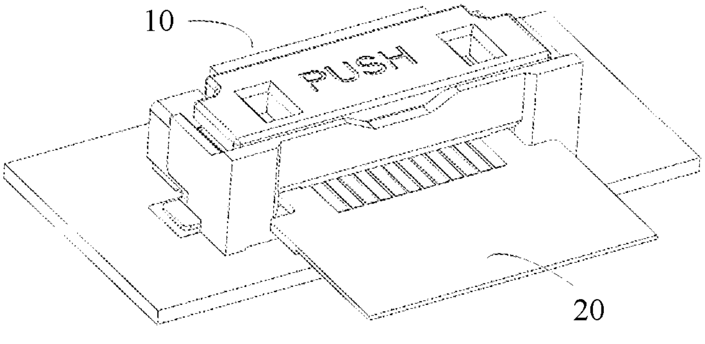
FIG. 5*a* is a schematic view of a front structure of an electrical connector with an external insert inserted according to an embodiment of the disclosure.
Figure 5B:
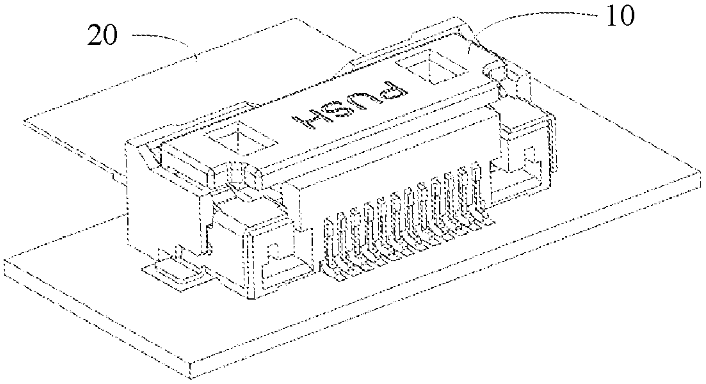
FIG. 5*b* is a schematic view of a back structure of an electrical connector with an external insert inserted according to an embodiment of the disclosure.
Figure 6:
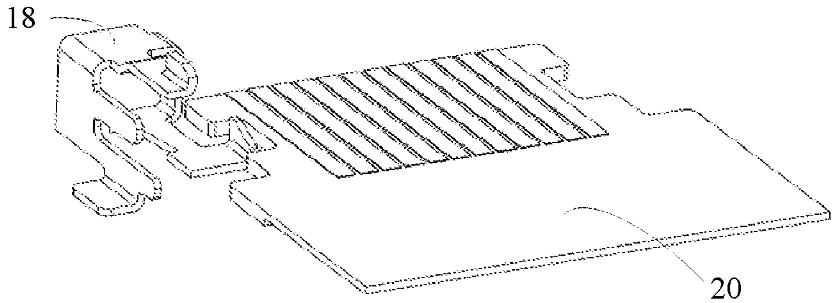
FIG. 6 is a schematic view of a partial structure of an electrical connector in a locking state according to an embodiment of the disclosure.

FIG. 5*a* and FIG. 5*b* are schematic views of the front structure and the back structure of the electrical connector 10 with the external insert 20 inserted, respectively. FIG. 6 is a partial schematic structure view of the electrical connector 10 with the external insert 20 inserted, which shows the position and connection relationship between the elastic support 18 and the external insert 20 when the external insert 20 is locked. When the external insert 20 is inserted into the insertion slot 124, it first contacts with the snap-fit part 1842 and presses the snap-fit part 1842 to make the second elastic arm 184 undergo elastic deformation and the snap-fit part 1842 leaves the insertion path. The external insert 20 is provided with the slot corresponding to the snap-fit part 1842. When the slot moves to the position corresponding to the snap-fit part 1842, the pressure applied to the snap-fit part 1842 disappears, and the second elastic arm 184 is reset so that the snap-fit part 1842 snaps into the slot of the external insert, as shown in FIG. 6, so as to lock the external insert 20 at the insertion position, which improves the retention force for the external insert 20, and prevents it from falling off and affecting normal operation of the product.

In some examples, the snap-fit part 1842 includes a slope to guide the insertion path of the external insert 20 as it is inserted. The slope corresponds to the position of the insertion slot of the body 12. The external insert 20 smoothly enters along the slope when inserted, and exerts pressure on the slope to move the snap-fit part 1842 away from the insertion path, and to make the second elastic arm 184 elastically deformed.

Figure 7:
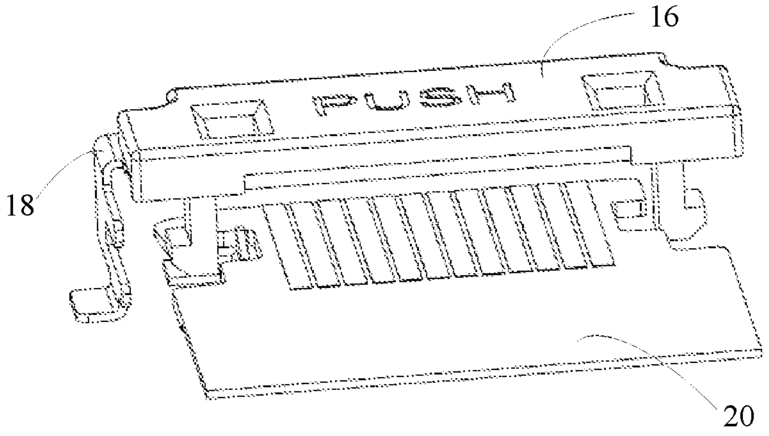
FIG. 7 is a schematic view of partial structure of an electrical connector in an unlocking state according to an embodiment of the disclosure.

When the external insert 20 needs to be unlocked, it exerts a force to the cover 16, to make the second connecting part 162 act on the second elastic arm 184, so as to release the snap-fit connection between the second elastic arm 184 and the external insert, such that the external insert 20 can be pulled out from the insertion slot 124 of the body 12 to realize unlocking. FIG. 7 shows the schematic view of the position and connection relationship among the cover 16, the elastic support 18 and the external insert 20 when the cover 16 is pressed to unlock the external insert. In the process when a force is applied to the cover 16 to make the second connecting part 162 act on the second elastic arm 184, the first elastic arm 182, which supports the cover 16, is elastically deformed. After the external insert 20 is pulled out, removing the force applied on the cover 16, so that the first elastic arm 182 applies elastic force to the cover 16 for the purpose of restoring and makes the cover 16 return to its original shape.

Figure 8:
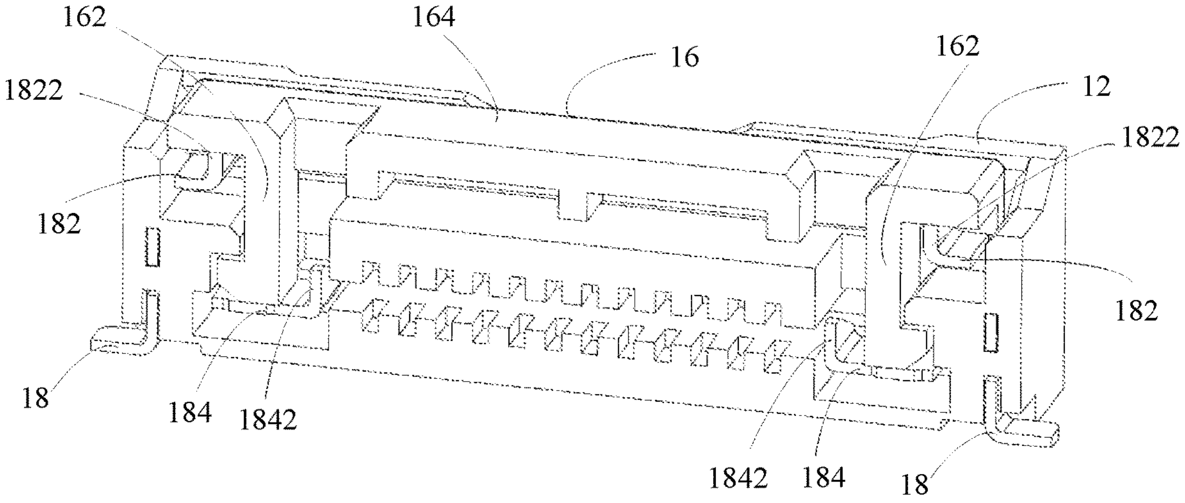
FIG. 8 is a schematic view of a structure of another electrical connector according to an embodiment of the disclosure.

FIG. 8 is another schematic structure view of an electrical connector according to one embodiment of the present disclosure, which more clearly shows the position and connection relationship among the body 12, the cover 16 and the elastic support 18. Thereof, the first elastic arm 182 of the elastic support 18 contacts with the top 164 of the cover 16, and the second elastic arm 184 of the elastic support 18 contacts with the second connecting part 162 of the cover 16.

In some examples, the assembly of the electrical connector 10 is as follows. Firstly, the terminal 14 is inserted into the terminal installation position 122 from the backside (the side where the terminal installation position 122 locates is referred herein to as the backside). Secondly, the elastic support 18 is inserted into the accommodating cavity 128 from the backside. Then, the cover 16 is covered on the body 12 from the top, such that the second connecting part 162 is movably connected to the first connecting part 126, and the first elastic arm 182 of the elastic support 18 provides support force for the cover 16.

The working principle of the electrical connector 10 can be described as follows. The external insert 20 is aligned with and inserted into the insertion slot 124. The external insert 20 contacts with the snap-fit part 1842 of the second elastic arm 184 during the insertion process and exerts a force on the snap-fit part 1842, thus the second elastic arm 184 is elastically deformed and the snap-fit part 1842 leaves the insertion path of the external insert 20. When the external insert 20 is inserted to the preset position, the slot of the external insert 20 moves to the position corresponding to the snap-fit part 1842, thus the second elastic arm 184 returns to its original shape and the snap-fit part 1842 snaps into the slot of the external insert 20 to realize the locking of the external insert 20 (in some examples, when the external insert 20 is locked at a preset position, the second connecting part 162 contacts with the second elastic arm 184 without interaction force therebetween, which is beneficial to the miniaturization of the product).

The snap-fit part 1842 can effectively prevent the external insert 20 from falling off abnormally, and provides good retention force for the external insert 20. To unlock the external insert 20, the cover 16 is pressed, so that the second connecting part 162 of the cover 16 contacts with the second elastic arm 184 and exerts pressure to it, such that the second elastic arm 184 is elastically deformed and the snap-fit part 1842 is driven to move and to be disconnected from the external insert 20, thus the external insert 20 is unlocked and can be pulled out. Finally, when the external insert 20 has been pulled out, removing the pressure on the cover 16, so that the first elastic arm 182 exerts an elastic restoring force on the cover (during the unlocking process, the first elastic arm 182 which supports the cover 16 is bent and elastically deformed when the cover 16 is pressed on), such that the cover 16 returns to its original position and realizes automatic resetting, which enables multiple operations.

In some examples, the electrical connector 10 includes a pair of elastic supports 18, which are symmetrically disposed at two ends of the body 12. Correspondingly, the body 12 is provided with a pair of accommodating cavities 128 at its two ends for accommodating the pair of elastic supports 18, as shown in FIGS. 1 and 2*a*. The cover 16 has a pair of second connecting parts 162 at its two ends, which extend outwardly from the top 164. The body 12 is provided with a pair of first connecting parts 126 at its two ends. The insertion slot 124 is disposed at the middle position of the body 12. When the external insert is inserted into the insertion slot 124, it is snap-connected at its left and right sides with the second elastic arms 184 of the elastic supports 18, respectively, so as to realize auto-locking. The auto-locking structure provides a higher retention force for the external insert and prevents it from falling off during use. And the user does not need to flip the cover, which is easy and convenient for operation.

The electrical connector 10, as described above, may be designed with a press type auto-locking structure. Moreover, the movable connection between the cover 16 and the body 12, as well as the positional relationship between the second connecting part 162 of the cover 16 and the elastic support 18, enables the user to exert force to the elastic support 18 by pressing the cover 16, to make the elastic support 18 elastically deformed and disconnected from the external insert 20, thereby implementing the unlocking function.

In some examples, the first elastic arm 182 is provided with a protrusion 1822, shown in FIGS. 4*a* and 4*b*, extending outwardly. The protrusion 1822 connects with the cover 16 to support the cover 16 when the cover 16 is covered on the body 12. A certain gap can be reserved between the elastic support and the cover by the support of the protrusion 1822, which is beneficial for heat dissipation. Moreover, the protrusion 1822 may be disposed at the middle position of the first elastic arm 182 to balance the force, which is beneficial for increasing the frequency of use and prolonging the life.

In some examples, an observation aperture 168 is disposed on the top of the cover 16, as shown in FIGS. 3*a* and 3*b*, for observing an insertion position of the external insert 20, and for the user to judge whether the insertion position is in place. The observation aperture 168 makes the insertion of the external insert 20 observable, which improves the convenience and accuracy of use, and the user can find and correct it in time when the insertion is not in place. In an embodiment, the observation aperture 168 is disposed on one side of the second connecting part 162, and corresponds to a position of the snap-fit part 1842 of the second elastic arm 184, so that the user can judge whether the external insert 20 is inserted in place by observing the snap-fit condition between the snap-fit part 1842 and the external insert 20.

In some examples, the body 12 is a plastic body and the cover 16 is a plastic cover. They can be obtained through an injection molding process. Engineering plastics can be used for manufacturing, such as liquid crystal polymers, polycarbonate, polysulfone, polyphenylene oxide, polyamide, Polyoxymethylene, which has good electrical insulation and arc resistance, and has the advantages of simple processing, low cost, short production time, and high efficiency. Liquid crystal polymer may be used in an embodiment, which has the advantages of good fluidity and is conducive to mold processing, especially suitable for the small spacing products disclosed in the present application. Injection molding process can be selected to manufacture the body 12 integrally, which improves the efficiency of production.

In some examples, the insertion slot 124 of the body 12 can be designed for horizontal insertion or vertical insertion of the external insert 20. The design of other components corresponding to different insertion ways needs to be adjusted accordingly, but its working principle and design for basic structure remain unchanged, which are not redundantly repeated herein.

Although the present disclosure has been described with reference to specific examples, these examples are merely illustrative and not intended to limit the present disclosure. It is obvious to those skilled in the art that changes, additions, or deletions to the disclosed embodiments can be made without departing from the spirit and scope of protection of the present disclosure.

What is claimed is:

1. An electrical connector, comprising:

a body having a terminal installation position for installing a terminal, a first connecting part, an accommodating cavity, and an insertion slot;

a cover having a second connecting part, the cover is movably connected to the body by the first connecting part and the second connecting part; and an elastic support fixed in the accommodating cavity, the elastic support has a first elastic arm and a second elastic arm, the first elastic arm supports the cover, the second elastic arm has a snap-fit part locking an external insert inserted into the insertion slot at a preset position, the cover is movable relative to the body to have the second connecting part press and elastically deform the second elastic arm, driving the snap-fit part to move and unlock the external insert.

2. The electrical connector of claim 1, wherein the first connecting part is snap-fit to the second connecting part.

3. The electrical connector of claim 2, wherein the first connecting part is a slot and the second connecting part is a bending structure.

4. The electrical connector of claim 1, wherein the first elastic arm has a protrusion extending outwardly to support the cover.

5. The electrical connector of claim 1, further comprising a pair of the elastic supports symmetrically arranged in the accommodating cavity at a pair of sides of the body.

6. The electrical connector of claim 5, wherein the insertion slot is arranged in a middle position of the body.

7. The electrical connector of claim 1, wherein the cover has an observation aperture for observing an insertion position of the external insert.

8. The electrical connector of claim 1, wherein a movable distance of the cover relative to the body is not less than a height of the snap-fit part.

9. The electrical connector of claim 1, wherein the first elastic arm is located above the second elastic arm.

10. The electrical connector of claim 1, wherein the second connecting part is in contact with the second elastic arm when the external insert is locked at the preset position.

11. The electrical connector of claim 1, wherein the snap-fit part includes a slope to guide an insertion path of the external insert when it is inserted.

12. The electrical connector of claim 1, wherein the external insert is inserted horizontally or vertically into the insertion slot.

13. The electrical connector of claim 1, wherein the insertion slot is disposed on a side of the body and the cover covers a top of the body.

14. The electrical connector of claim 1, wherein the terminal installation position is on a front side of the body and the insertion slot is on a back side of the body.

15. The electrical connector of claim 1, wherein the external insert first contacts the snap-fit part during insertion.

16. The electrical connector of claim 15, wherein the external insert has a slot corresponding to the snap-fit part, and when the slot is at a position of the snap-fit part during insertion of the external insert, the elastic deformation of the second elastic arm is released.

17. The electrical connector of claim 16, wherein the snap-fit part engages the slot to lock the external insert at an insertion position.

* * * * *